Patented Dec. 16, 1941

2,266,674

UNITED STATES PATENT OFFICE 2,266,674

VITAMIN

Albert Gerhardus Boer, deceased, late of Naarden, Netherlands, by Cornelia Boer-van der Wurff, sole heir, Naarden, Netherlands, and Johannes van Niekerk, Amsterdam, Engbert Harmen Reerink, Bussum, and Aart van Wijk, Eindhoven, Netherlands, assignors, by mesne assignments, to Hartford National Bank and Trust Company, Hartford, Conn., as trustee No Drawing. Application May 9, 1939, Serial No. 272,699. In Germany June 19, 1935

4 Claims. (Cl. 260—397.2)

The present invention, which is a continuation in part of our copending U. S. application Ser. No. 30,156, filed July 6, 1935, now Patent No. 2,163,659, relates to the class of substances of paramount biological interest commonly designated as vitamins, and more especially to the substance, or group of substances, belonging to this class, which has hitherto been known under the name of "antirachitic vitamin" or "vitamin D" and which is capable of preventing or curing rickets. It has particular reference to that modification of vitamin D which is especially active for chicks.

Our invention relates furthermore to the precursor, the so-called "provitamin D," from which that vitamin D can be prepared by irradiation with ultraviolet light.

The invention also includes the processes of producing these substances.

The history of the research work done in this field of science, as written for instance by Waddell and published in July, 1934, in the Journal of Biological Chemistry (vol. 105, p. 711–739) reveals incessant, but on the whole fruitless efforts, on the part of quite a number of highly skilled investigators, to trace the nature and constitution of the antirachitic principle especially active for chicks and eventually to isolate and produce it, if not on a large scale, at least in the laboratory. Waddell, as far as we are informed, was the last and most successful worker in this field, and his discovery, that the antirachitic factor of irradiated cholesterol is as potent for chicks as the vitamin D of cod liver oil, the longest known antirachitic remedy, and that the provitamin constituent of cholesterol is a substance different from ergosterol, which one had hitherto believed to be the sole precursor of vitamin D, was a great step forward in this still mostly unknown field of biological science. However important his findings may have been from a scientific point of view, they did not contribute much to the solution of the problem of how to isolate this active principle or its precursor and, which is still more important, to produce it on a large scale so as to bring it within reach of every poultry farmer.

All we knew with regard to manufacture of antirachitic active preparations on an industrial scale was, that they could be produced by irradiation, with ultra-violet rays, of animal and vegetable matter containing unsaponifiable lipoids, and before Waddell's publication the provitamin of all the materials used was believed to be identical with ergosterol in every case. It had been furthermore shown that, while the artificial vitamin D produced in ergosterol by irradiation heals rickets in the same way as the natural vitamin D in cod liver oil, there exists a marked difference between these two vitamins. It had been found that preparations of these two vitamins possessing the same potencies—computed by comparison with the international standard preparations for vitamin D on rats—when tested on chicks, did not present the same activity, but that from 30 to 50 times as many "international units" of irradiated ergosterol were required to produce the same antirachitic effect, as of cod liver oil. Waddell found that irradiated commercial cholesterol has about the same activity for chicks as cod liver oil, if compared on the base of the same number of international rat units.

The highest amount of provitamin ever encountered by prior investigators in cholesterol (from the egg of a hen fed with ergosterol) was 0.32%, and in those cases known to us, where no ergosterol had been fed to the animals, not even this figure has ever been reached. Now, since according to Waddell's paper he never obtained more than 5 international units per milligram irradiated cholesterol and since our own investigations had convinced us, that it would be impossible, according to the methods hitherto followed, even if starting from a cholesterol preparation containing as much as 0.3 per cent provitamin, to obtain more than 30 international units per mg. irradiated cholesterol; since moreover the low degree of solubility of cholesterol in oil would not favor the commercial preparation of solutions possessing more than 200 to 300 international units per cubic centimetre, and in view of the high costs of production we concluded that the cholesterol material hitherto used was not a suitable source of provitamin production and that we would have to search for another more prolific and easily available raw material.

We have succeeded in tracing not only such a material available everywhere and in unlimited quantity, but also the means for recovering from this material on a commercial scale preparations rich in antirachitic principle especially active on chicks, and we are now able to not only provide the market at low cost with high percentage provitamin D preparations excellently suited for the production of the said antirachitic principle, but also to isolate the chicken-provitamin D as a well-defined crystalline compound.

Our invention, therefore, comprises the method of producing preparations rich in provitamin by starting from materials never before tested for such purpose, the new preparations obtained in this manner, further the pure chicken provitamin D itself and finally the antirachitically active preparations derived therefrom.

We are now going to describe our invention and how the same is to be performed.

THE STARTING MATERIAL

As above explained, the provitamin D content of the cholesterol material hitherto used never exceeded 0.32 per cent.

In searching for a more abundant source of chicken provitamin D we finally allowed ourselves to be guided by a consideration, which at first sight appears to be little founded; it occurred to us that, since ergosterol, although traceable in all plants, is far more preponderant among the sterols of the lower plants (cryptogams) than among those of the higher plants (phanerogams), possibly similar conditions might prevail amongst animals in regard to the contents of that sterol in which irradiation with ultraviolet rays generates the active vitamin principle. We thought that this provitamin-sterol might be much more preponderant among the sterols of the lower animals (Invertebrata) than in the cholesterol among those of the higher animals (Vertebrata). Following this idea we started an investigation of the sterols of the Invertebrata, on which as sources of the antirachitically activatable provitamin nothing could be found in literature. This investigation was not encouraged by the fact that in many instances the sterols found in these materials had been proved to be different from cholesterol, so that it seemed doubtful whether the provitamin D, which we might ultimately trace therein, might be the chicken-provitamin D we were looking after.

In view of an extended series of tests made with sterols recovered from various kinds of Invertebrata, including Annelida, Arthropoda and Mollusca, we feel authorized to say that we have in fact traced the first and probably the only way of producing the chicken-provitamin D on the largest possible scale. For the sterol fraction of most of the animals of the large family of Invertebrata, which we have tested, have been found to yield many times, and some up to and beyond the hundredfold, of the yield of provitamin D normally recoverable from the sterols of the Vertebrata.

Obviously, since these raw materials are living organisms, the provitamin content in different individuals of the same species will not be constant, but is bound to vary according to the stage of development (age), conditions of living, season, climate, etc.

METHOD OF PRODUCING PREPARATIONS RICH IN CHICKEN PROVITAMIN D

In the preparation of unsaponifiable lipoids and sterols from Invertebrata we had to keep in mind that the provitamin is a rather unstable substance. We prefer starting with whole animals in a state as fresh as possible, which are finely comminuted, for instance in a meat chopper, or in a grinding mill adapted for the purpose. The mashed material is dehydrated with alcohol or better still in a rotating vacuum drier. If alcohol is used, it is finally filtered with suction, diluted to about 50% and the fatty matter extracted therefrom with a low boiling solvent such as light petroleum. The dehydrated material is next extracted with light petroleum, until the fat is completely removed, the petroleum fractions are united, washed with water and dried with anhydrous sodium sulfate. We may however also extract the dried material in an ordinary extractor, or dry and extract it in a rotating vacuum extractor, however taking care not to raise the temperature above 50° C. or thereabouts. The light petroleum is distilled off and the fatty residue saponified at a moderate temperature with a solution of 50 parts by weight KOH in 50 parts distilled water and 500 parts alcohol of 96%, calculated on 100 parts of the residue. This mixture is heated two hours on a steam bath under the reflux condenser. The soap solution is cooled and diluted with distilled water to an alcohol concentration of 15 to 20%. From this solution the unsaponifiable fraction may for instance be extracted five times with ethyl ether, the ether washed five times with distilled water and distilled off, care being taken that the contact with ether be as short as possible.

Alternatively the diluted soap solution may be treated with a solution of a calcium salt, equivalent to the amount of KOH used, whereby the unsaponifiable fraction is precipitated along with the lime soaps. The KOH in excess is converted into $K_2CO_3$ by adding $CO_2$ or a $NaHCO_3$ solution followed by filtering and extracting the precipitate several times with acetone and finally evaporating the acetone in vacuo and drying the residue.

From this unsaponifiable residue the sterol fraction is prepared by recrystallisation from ethyl alcohol and methyl alcohol. In many cases the unsaponifiable matter contains large proportions of oils or wax-like material, relatively insoluble in methyl alcohol, that can be decanted or filtered off. In these cases the yield of sterol fraction is impaired, unless the mother liquors are treated further in a manner adapted to the circumstances, because the impurities tend to keep the sterol in solution. If the unsaponifiable matter should contain a high percentage of coloring matter such as for instance carotinoids, special care should be taken to avoid losses of provitamin by the destructive influence of light and the oxygen of the air.

We have tried to isolate the sterol fraction by precipitation with digitonin and extracting the precipitate with boiling xylene in the usual way, but this process is unsuitable because the provitamin is easily destroyed. For the purification of the sterol fraction, which may be effected for instance by recrystallisation or by distillation in a high vacuum, no treatment with adsorbents, such as charcoal, should be resorted to, because this also leads to destruction of the provitamin.

After the sterol fraction has been purified sufficiently, the absorption spectrum is measured in the usual way; the absorption spectrum is compared with that of ergosterol, and the amount of ergosterol, that would give the same absorption, is calculated in per cents of the amount of sterol used. This percentage is used to indicate the amount of provitamin present.

As will be seen from the foregoing description, we are operating with the fresh raw material, taking care to avoid heating and quite especially boiling with water and drying with steam.

ACTIVATION OF THE CHICKEN-PROVITAMIN D PREPARATIONS BY IRRADIATION

The sterol fraction may be activated by irradiation methods which have proved to be suitable for activating ergosterol.

We prefer to operate in complete absence of oxygen under continual stirring of the solution with light from which the wave lengths below 284 millimicrons have been filtered off by a xylene filter, and stopping the irradiation before more than about 50% of the provitamin has been transformed, as described in our paper in Biochemical Journal 25, 1001-1002 (1931). For the present experiments we used an all-quartz absorption cell connected with the irradiation apparatus, and we dissolved the different sterol fractions in ether free of peroxide in such a concentration that the absorption was practically the same in every case. We chose the concentration so small that practically the whole energy of the mercury line 313 millimicrons and the main part of the line 302 millimicrons were not absorbed in the irradiation apparatus.

After irradiation the absorption spectrum of the irradiated solution can be measured again. We found that the photochemical reaction as represented by changes in the absorption spectrum is the same as in the case of ergosterol (see our paper in Bio-chem. Journ. 23, 1929, 1294). Therefore the absorption spectrum after irradiation enabled us to calculate the degree of transformation in the same way as with ergosterol; and the rat tests have confirmed this in every respect.

Irradiation being completed, the solution was poured into antirachitically inactive arachis oil in vacuo and the ether was distilled off. The oil solution was then diluted to the proper concentration for the rat and chicken tests.

THE CHICKEN TEST

In the chicken test we started with one-day old chickens which were fed during 3-4 weeks on a ration consisting of 12% casein, 25% ground whole wheat, 59% ground whole yellow maize, 1% dried yeast, 2% CaCO$_3$ and 1% NaCl, 1½% arachis oil containing the vitamin D preparation being added to the mixture.

We found that 70 international units of codliver oil vitamin D per 100 grams ration was enough to guarantee a normal growth and boneformation of the chickens up to 3 or 4 weeks. A smaller amount of vitamin D led to an abnormal bone-formation, which could be detected radiographically. We have thus been able to perform a quantitative estimation of vitamin D with chickens as test animals, which need not be gone into in detail.

We will only give a representative example: 181 mgs. of a preparation of sterol from mussels, containing, according to the spectrum, 12½ per cent provitamin D, were dissolved in ether free from peroxide and this solution was irradiated under continuous stirring in vacuo with the light, filtered through a xylene solution, of a mercury vapor quartz lamp, until about 30 to 35 per cent of the provitamin present in the substance was transformed. The irradiated solution, while still in the vacuum, was then entered into 190 cubic centimetres arachis oil and the ether evaporated in vacuo. The antirachitic effect of the oil solution was tested on rats in comparison to the international standard solution of vitamin D and further on chicks in comparison with a cod-liver oil containing 100 international units (rat units) vitamin D per cubic centimetre. The rat test showed the oil solution to contain about 750 international units per cubic centimetre. The chick test showed the oil solution to be about 7½ times stronger than the cod-liver oil. Thus 181 milligrams sterol from mussels forming the starting material yielded about 140,000 international units of vitamin D, which is about 800 international units per milligram.

EXAMPLES OF THE PRODUCTION OF HIGH PERCENTAGE PREPARATIONS OF CHICKEN PROVITAMIN D

In the practical operation of the process of producing preparations rich in provitamin we proceeded for instance as follows:

EXAMPLE 1

Mollusca 4.1 kilograms sea mussel (*Mytilus edulis*), from which the shells were removed, were comminuted in a meat chopper and dried in vacuo at about 50° C. The dried mass was extracted with 3.5 liters petroleum ether boiling within the range of 40-60° C., the extraction being effected with three portions of the ether. The extract was washed with water and dried with Na$_2$SO$_4$. After filtration the ether was distilled off and the 45 grams fatty matter, which remained over, were saponified by heating them during two hours under the reflux condenser with a solution of 20 grams KOH in 20 cubic centimetres water and 200 cubic centimetres alcohol of 96%. After cooling, the soap solution was poured into 1 litre distilled water and the aqueous soap solution shaken five times with ethyl ether, 1.1 litres of which were required altogether. The etheric solution was now shaken five times with distilled water, 100 cubic centimetres water being used each time, whereupon it was dried with Na$_2$SO$_4$ and filtered. On removal of the ether by distillation there remained over a solid reddish yellow mass weighing about 7.5 grams. This crude unsaponifiable fraction of the fatty matter was now recrystallized from 50 cubic centimetres alcohol of 96%, once more from 25 cubic centimetres of such alcohol and finally from 110 cubic centimetres methyl alcohol.

The sterol fraction recovered in this manner weighed 2.5 grams and proved to be a light yellow crystalline mass. By measuring the absorption spectrum of these crystals we found the characteristic absorption bands of the provitamin to be present in a strength indicating a provitamin content of the substance of 16 per cent. As mentioned above, we took care to keep the treatment with ether as short as possible. The provitamin content of 16% of the sterol fraction from mussels, as described in this example, corresponds after irradiation to an antirachitic activity of about 1600 international units per milligram.

EXAMPLE 2

2.2 kilograms periwinkle (*Littorina littorea*) were crushed together with their shells in a mortar and then comminuted in a meat chopper, whereupon the mass was treated with 2 litres alcohol. After dilution with water the alcohol was shaken with petroleum ether and the dried mass also extracted with petroleum ether. After washing, drying and evaporating the ether, we obtained a residual fatty matter weighing 11.8 grams, which was now saponified by heating it 2 hours under the reflux condenser with a solution of 6 grams KOH in 6 grams water and 50 cubic centimetres alcohol of 96%. The soap solution was diluted with 250 cubic centimetres distilled water and the unsaponifiable fraction separated by means of ethyl ether. We thus obtained 1.85 grams unsaponifiable matter from which we produced by recrystallization from alcohol and methyl alcohol the sterol fraction under the form of light yellow crystals weighing 0.49 gram.

The absorption spectrum showed these crystals to contain 26 per cent provitamin D corresponding after irradiation to an activity of about 2,600 international units per milligram.

EXAMPLE 3

*Annelida*

404 grams earth-worms (*Lumbricus*) were comminuted in a meat chopper and extracted twice with 96% alcohol and three times with petroleum ether B. P. 40°–60°. The alcoholic extracts were diluted to 50% alcohol and extracted with petroleum ether. The combined petroleum ether extracts were washed with water and dried over $Na_2SO_4$ and the solvent distilled off. The extracted matter weighing 4.3 grams was saponified with a solution of 2.2 grams KOH in 2.2 cubic centimetres water and 16 cubic centimetres alcohol. From the soap solution were extracted with ethyl ether 0.9 gram unsaponifiable matter which on being recrystallized from alcohol, and methyl alcohol yielded a sterol fraction of white crystals weighing 0.3 gram. The preparation was found to contain 11 per cent provitamin corresponding after irradiation to an antirachitic activity of about 1,100 international units.

EXAMPLE 4

800 grams small fresh water-worms (*Tubifex*) were comminuted in a meat chopper and treated with alcohol of 96% and petroleum ether of boiling point 40°–60° C. in the way described in Example 2. All petroleum ether extracts were combined, washed with water, dried over $Na_2SO_4$ and evaporated. The extract weighing 13.0 grams was saponified and the unsaponifiable part was extracted with ethyl ether. We obtained 2.5 grams which were recrystallised from alcohol and methyl alcohol, yielding a white crystalline sterol fraction weighing 1.12 grams. These crystals were found to contain 17 per cent provitamin corresponding, after irradiation, to an antirachitic activity of about 1,700 international units per milligram.

As compared with the maximum of 5 international units per milligram of irradiated cholesterol obtained by Waddell and the fraction of one per cent provitamin content of any cholesterol preparation hitherto obtained from vertebrate animals, the sterol fraction of the invertebrate animals tested according to the above examples showed the chicken provitamin D contents to vary between 2.5 and 26 per cent, being in any case higher than 2 per cent, the activity of the irradiated products being higher than 50 and in the above examples between 250 and 2,600 international units per milligram.

Obviously, as stated at the beginning, the figures found in our tests are bound to vary according to the stage of development (age) of the animals, to their conditions of living, to the season in which they are caught, to climatic conditions and so on.

PREPARATION OF CHRYSTALLIZED CHICKEN-PROVITAMIN D

We have further succeeded in concentrating the sterols obtainable from the fatty matter in invertebrate animals to the extent of enabling us to produce a pure crystallized provitamin melting at 149.5 to 150° C., whose specific rotation, measured in benzene, is $[\alpha]_D = -118°$.

In the production of this pure provitamin D we converted part of the sterol fraction recovered in accordance with Example 1 into the acetate by treating same with acetic anhydride and pyridine. The mixture of acetates thus obtained was dissolved in a mixture of benzene and light petroleum and adsorbed in a column of alumina prepared according to Brockmann. By lixiviation with the same solvent a large portion of the acetates of the inactivatable sterols could be removed and the adsorbed material was finally recovered by lixiviation with benzene, to which some methyl alcohol was admixed. In this way we succeeded in concentrating the provitamin acetate about two and a half times in a single adsorption operation. Starting from an acetate mixture containing about 7 per cent provitamin acetate, we obtained, after 3 adsorption operations, a mixture containing about 60 per cent provitamin acetate. This mixture was recrystallized three times from methyl alcohol and yielded an acetate, the absorption spectrum of which corresponded to the spectrum of 94% by weight of ergosterol acetate. Three further recrystallizations did not materially alter this absorption spectrum; the melting point changed only slightly.

We consider this acetate to be the pure provitamin acetate melting at 160 to 161° C. (uncorrected) and having a $[\alpha]_D = -78°$ (dissolved in benzene). For the sake of comparison we note the melting point of pure ergosterol acetate as 175.3 to 176° C. (uncorrected) and $[\alpha]_D = -96°$. This shows that the provitamin from the sterol here used as starting material is different from ergosterol.

The provitamin itself was obtained by saponification of the acetate. After many recrystallizations from methyl alcohol its melting point was found at 149.5 to 150° C. in contradistinction to ergosterol melting at 163.5 to 164° C. The specific rotation of the chicken-provitamin D in benzene $[\alpha]_D$ was found to be $-118°$, as against $-136°$ for ergosterol.

The absorption spectrum of the pure provitamin differs only slightly from that of ergosterol. This pure provitamin is further differentiated from ergosterol by the fact that, whereas the active principle formed in ergosterol (calciferol) has an activity of about 1,000 international chick units per milligram, the active principle formed in said provitamin has an activity ranging from about 10,000 to 40,000 international chick units per milligram.

This pure provitamin is a typical sterol, which is precipitated by digitonin in alcoholic solution. It is decomposed relatively rapidly in etheric solution and in boiling acetone, if exposed to the air. In short, it behaves rather like ergosterol, but it seems to be a little more susceptible to oxidation.

We have furthermore succeeded in producing crystallized chicken provitamin D from the sterol fraction recovered in accordance with Example 3, by converting it into the isobutyrate by treating with isobutyric anhydride and pyridine and recrystallizing the resulting isobutyrate from alcohol. The resulting mixture of isobutyrates (10.15 gr. containing 11½% of provitamin isobutyrate) was dissolved in a mixture of benzene and light petroleum and repeatedly absorbed in a column of alumina prepared according to Brockmann, followed by lixiviation by the same solvent. In this way a satisfactory separation between the isobutyrates of the inactivatable sterols and the isobutyrates of activatable provitamin-sterol was obtained. A preparation of 410 mg. provitamin isobutyrate of 85% purity was recrystallized six times from methyl alcohol, saponified and converted into the acetate. This spectroscopically pure acetate was recrystallized three times from ethyl alcohol and yielded 210 mg. white crystals, melting point 155–159° C. specific rotation in benzene $[\alpha]_D = -91.5°$. After saponification a crystalline chicken-provitamin-sterol was obtained, melting at 150–151° C. specific rotation in benzene $[\alpha]_D = -133°$.

We have furthermore succeeded in producing crystallized chicken provitamin D from the sterol fraction recovered in accordance with Example 4, by converting it into the acetate by treating with acetic anhydride and pyridine, and the resulting acetate recrystallized from acetic anhydride and methyl alcohol-ether. 12.3 g. acetate containing 26.4% of provitamin acetate were dissolved in a mixture of benzene and light petroleum and in two runs adsorbed in a column of alumina prepared according to Brockmann. By lixiviation with the same solvent a large portion of the acetates of the inactivatable sterols could be removed with the first 700 ccm. of liquid running through. The next two litres of solvent running through contained (in toto for the two runs) 5.1 g. with 47% of provitamin-acetate. This material was again treated in the same way and yielded 1,110 mg. of a material which was spectroscopically pure provitamin-acetate. After three crystallizations from methyl alcohol the preparation (672 mg.) melted at 150.5–154.5° C. and had a rotation angle of $[\alpha]_D = -87°$ (in benzene). After saponification and recrystallisation from methyl alcohol a crystalline chicken-provitamin-sterol was obtained in the form of white crystals melting at 143–146° C. and having a specific rotation in benzene of $[\alpha]_D = -127°$.

We have furthermore succeeded in producing crystallised chicken provitamin D from the sterol fraction recovered in accordance with Example 2, by converting it into the acetate by boiling with acetic anhydride during thirty minutes and recrystallizing the resulting acetate from boiling ethyl alcohol. This mixture of 25 g. periwinkle-sterol-acetates containing 6.6% of provitamin-acetate was repeatedly treated in an adsorption column of alumina prepared according to Brockmann. This was done by adsorbing a suitable portion dissolved in a mixture of benzene and light petroleum followed by lixiviation by the same solvent. The liquid which runs through first, contains a large part of the acetates of the inactivatable sterols with a small amount of provitamin-acetate. This part is collected separately and lixiviation is carried on with the same solvent until practically all the adsorbed provitamin acetate has been dissolved from the column. The residue obtained after evaporating in vacuo the solvent from the first collected filtrate is combined with corresponding residues from other runs and subjected to the same treatment again. This treatment was repeated with the different fractions until finally a preparation of 731 mg. of a spectroscopically pure provitamin acetate was obtained. After three crystallisations from methyl alcohol the preparation melted at 135–136° C. and the rotation angle in benzene was $[\alpha]_D = -85.5°$. After saponification and recrystallisation from methyl-alcohol a chicken-provitamin sterol was obtained in the form of white crystals melting at 137–137.5° C. and having a specific rotation in benzene of $[\alpha]_D = -124°$.

Various changes may be made in the details disclosed in the foregoing specification without departing from the invention or sacrificing the advantages thereof.

The term "international chick unit" as used in the claims is to be understood to mean the same anti-rachitic activity on chicks as would be produced by the quantity of cod liver oil which in the rat test possesses an antirachitic activity of one international unit.

What we claim is:

1. A process for producing provitamin preparations from a crude extract of an invertebrate animal material, comprising the steps of treating the crude extract to esterify the sterol content thereof, dissolving the esters in a non-polar organic solvent, submitting the solution of esters to a fractional adsorption in an adsorption column containing alumina, and separating the fraction containing the main part of the provitamin ester.

2. A process for producing provitamin preparations from a crude extract of an invertebrate animal material, comprising the steps of treating the crude extract to esterify the sterol content thereof to a saturated fatty acid ester, dissolving said ester in a non-polar organic solvent, submitting the solution of the ester to a fractional adsorption in an adsorption column containing alumina, and separating the fraction containing the main part of the provitamin ester.

3. A process for producing provitamin preparations from a crude extract of an invertebrate animal material, comprising the steps of treating the crude extract to esterify the sterol content thereof to an acetic acid ester, dissolving the ester in a non-polar organic solvent, submitting the solution of the ester to a fractional adsorption in an adsorption column containing alumina, and separating the fraction containing the main part of the provitamin ester.

4. A process for producing provitamin preparations from a crude extract of an invertebrate animal material, comprising the steps of treating the crude extract to esterify the sterol content thereof to an isobutyric acid ester, dissolving the ester in a non-polar organic solvent, submitting the solution of the ester to a fractional adsorption in an adsorption column containing alumina, and separating the fraction containing the main part of the provitamin ester.

C. BOER-v. D. WURFF,
*Administratrix of Estate of Albert Gerhardus Boer, Deceased.*
JOHANNES van NIEKERK.
ENGBERT HARMEN REERINK.
AART van WIJK.